Feb. 7, 1961  P. F. WANGNER, JR  2,970,345
PROCESS FOR EMBOSSING AND VENTING A RESIN COATED FABRIC
Filed May 24, 1957

INVENTOR
PHILIP F. WANGNER, JR.

BY
AGENT

United States Patent Office 2,970,345
Patented Feb. 7, 1961

2,970,345

PROCESS FOR EMBOSSING AND VENTING A RESIN COATED FABRIC

Philip F. Wangner, Jr., Newburgh, N.Y., assignor to E. I. du Pont de Nemours and Company, Wilmington, Del., a corporation of Delaware Filed May 24, 1957, Ser. No. 661,344

4 Claims. (Cl. 18—56)

This invention relates to a continuous process for simultaneously embossing and venting thermoplastic resin coated fabrics, apparatus therefor and the resulting product.

Vinyl resin coated fabrics have several of the qualities sought for in the art of upholstering padded furniture and automobile seats. They form a class of flexible covering materials which is superior to woven fabrics in some respects. They are tough and wear resistant. They are available in an unlimited variety of colors, and they are produced in large volume by economical methods. Their resistance to soiling and to water damage is well known. But certain drawbacks of vinyl coated fabrics have seriously restricted their use as upholstery materials.

The chief limitation of resin coated fabrics from the user's standpoint is their poor comfort characteristics. In their unmodified form, these smooth imperforate covering materials allow no air or moisture to pass through them, or along the surface in contact with the person. The inability of the material to "breathe" allows the temperature and moisture levels to mount to an extremely uncomfortable degree on the parts of the person in contact therewith; this condition is of course aggravated by warm and humid climates.

A practical numerical system of indicating the seating comfort quality of a material is by means of the so-called "leather permeability value" or LPV. This value indicates the degree of water vapor permeability and is expressed in grams of water vapor transpired through 100 square meters of the material being tested in one hour at 23° C. and 90% relative humidity. A description of the LPV test method is given by Kanagy and Vickers in "Journal of American Leather Chemists Association," 45, 211-242 (April 19, 1950).

Extensive prior experience has indicated that an upholstery material should have an LPV of at least 5000, and preferably over 7000, for good seating comfort.

In addition to their poor seating comfort properties, the unmodified resin coated materials leave much to be desired in pliability, surface texture and appearance.

Heretofore, many processes have been proposed to transform resin coated fabrics into comfortable and attractive upholstery materials, but all have failed to achieve a complete transformation. Perforation or venting has been accomplished by mechanical and electrical punching methods, with a further sacrifice in appearance. Prior embossing methods have provided some improvement in surface texture and appearance, but they have either failed to produce sufficient porosity and pliability, or they have failed to provide a continuous uninterrupted pattern.

It has been proposed to emboss and vent the thermoplastic resinous film by means of a woven metal screen in a flat plate press. This is a slow batch process and the embossed pattern is interrupted at each end of the platen and screen. It has also been proposed to provide a continuous transformation process by mounting the metal screen on an embossing roll. This process also failed to produce a continuous pattern because of the imprint left by the laced or welded seam where the ends of the screen were joined. Moreover, it has been impossible to emboss deeply enough for upholstery quality, porosity and appearance unless the roller pressure was so high that the fabric was damaged. Continuous patterns have been embossed by employing an embossing roll engraved with a screen pattern, but this process does not form vents in the coating without damaging the fabric.

In the conventional roller embossing process, only momentary pressure is exerted on the material, thus the dwell time is insufficient for venting the coating layer, that is, forming holes or vents of sufficient size and number for good permeability.

The primary object of this invention is to provide a continuous process for transforming resin coated fabrics into attractive and comfortable upholstery materials.

A particular object is to continuously and simultaneously emboss and vent a vinyl resin coated fabric.

Another object is to provide an apparatus by means of which the aforementioned process may be performed.

Yet another object is to provide a deeply embossed and vented resin coated fabric having a continuous uninterrupted pattern in which the vents are narrower at the surface of the coating than the central portion parallel with the fabric substrate.

Still another object is to provide a vinyl resin coated upholstery material having an attractive pattern and an LPV of at least 5000.

Other important objects will be readily apparent from the following description of the invention.

The objects of this invention are accomplished by heat softening the coating of a thermoplastic resin coated fabric, continuously pressing a wire belt into and through the heat softened coating, continuing the pressing for at least 10 seconds and thereafter separating the wire belt from the coating.

A continuous length of a thermoplastic resin coated fabric is advanced into and through the pressure zone in such a manner that the resin coating is in contiguous relationship with the wire belt. The resin coating is heated about its softening temperature and the wire belt is pressed into and through the heat softened coating, the interstices of the wire belt become filled with the coating. After the resin coated fabric leaves the pressure zone and before it is separated from the wire belt, the coating is cooled to at least partially set the coating. The resulting continuous length of embossed and vented material, now a high quality covering material for seat cushions and the like, is wound up on a storage reel.

The principles and practice of this invention will be best understood from the following detailed description of a preferred embodiment selected for purpose of illustration as shown in the accompanying drawing, in which.

*Example 1*

A continuous length of vinyl resin coated fabric is prepared by calender coating a standard knit cotton fabric (weighing 5 oz./sq. yd. and having 31 wales and 33 courses as it leaves the knitting machine) with a conventional colored vinyl chloride resin calender composition. The vinyl chloride resin composition contains about 42% by weight of a copolymer of vinyl chloride and vinyl acetate, 33% di(2 ethyl hexyl) phthalate and 25% pigment and filler. The resin coated fabric has a coating layer thickness of about 35 mils and an overall thickness of about 46 mils. A thin coat of sealer is applied to the resin surface to reduce tackiness in accordance with customary procedures. The coated fabric is wound up on a reel from which it is fed into the embossing apparatus.

Figure 1:
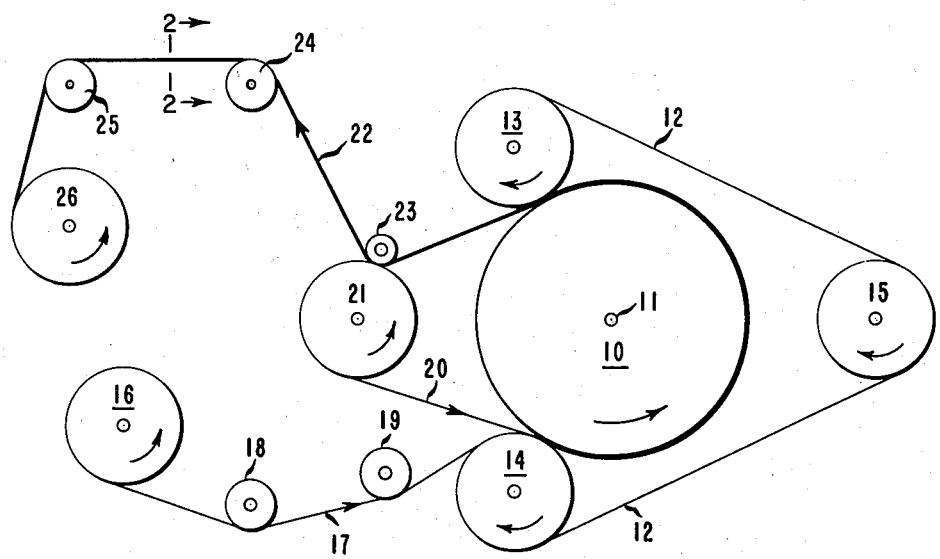
Figure 1 is a diagrammatic view of an apparatus in side elevation showing the process in operation.

Referring to Figure 1 of the drawing, the apparatus has a hollow steel drum 10 mounted for rotation on shaft 11 and coupled to a steam line (not shown) by means of which the drum is heated. The drum is about 80 inches wide and about 6 feet in diameter, and rotates at a rate such that the pressure is applied to the coated fabric for about 1.5 to 2.0 minutes. A flexible steel pressure band 12 is looped about a top guide roll 13, a bottom guide roll 14 and a guide roll 15, then passes over the surface of drum 10 for about 230°.

The guide roll 13, which is driven, presses on band 12 and causes it to rotate drum 10. The guide roll 15 is mounted in such a manner that it can be moved to and from drum 10 so as to vary the pressure of the band 12 upon the surface of the drum 10.

An endless seamless wire belt 20 passes around guide roll 21 and then around drum 10 between pressure band 12 and drum 10, all three elements traveling at the same linear rate of speed. Belt 20 is a wire belt made from stainless steel wire 35 mils in diameter, and has a mesh size of 7 x 50 (wires per inch in the direction of the width and length respectively). The ends are invisibly joined by means of a transverse pin which is part of the belt structure. A continuous length of a smooth surfaced resin coated fabric 17 described above, which is to be transformed into embossed and vented upholstery material, is mounted on reel 16.

The coated fabric 17 is lead under the guide rolls 18 and 19; then, with the resin coating contiguous with wire belt 20, the coated fabric is advanced into the nip formed by band 12 and belt 20 as they pass into the nip formed by drums 10 and 14. Thus, the resin coated fabric 17 enters the pressure zone formed between the surface of drum 10 and band 12 with the resin layer in contact with the wire belt 20, and while in the moving pressure zone the resin layer and belt 20 are heated to about 340° F. by the heat from drum 10 and the resin layer is thereby softened. A pressure of about 75 p.s.i., exerted by band 12, presses the wire belt into and through the coating in which the wires of belt 20 come to rest against the fabric substrate of coated fabric 17. The resin layer acquires the pattern of the wire belt in reverse, or in the negative. After being in the moving pressure zone for about 1.5 to 2 minutes the coated fabric is carried therefrom by belt 20 upon leaving the nip between roll 13 and drum 10. While the resin of the now transformed coated fabric 22 is still within the interstices of moving belt 20, it is cooled to a more solid condition. The continuous length of embossed and vented coated fabric 22 is separated from belt 20 at guide roll 23, it then passes over a pair of guide rolls 24 and 25 and is finally wound up on reel 26.

During the heating and pressing of the coated fabric the coating flows away from the base fabric where the outermost portions of the wires of the belt contact the fabric causing the coating to flow around more than 180°, but less than 360°, of the circumference of the wires in belt 20. After partially setting the coating by allowing it to cool somewhat the coating is sufficiently soft and elastic to permit the wire belt to be pulled away from the coating so as to leave bulbous shaped vents in the coating as shown in Figure 2 of the drawing, the width of the vents being narrower at the surface of the coating than the central portion parallel with the fabric substrate.

Figure 2:
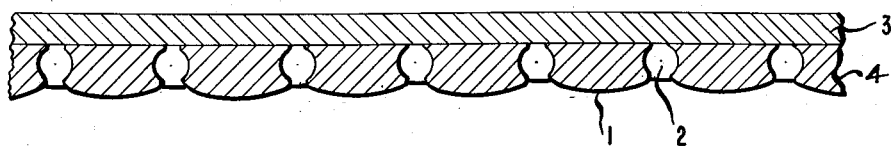
Figure 2 is a view in cross-section through the embossed and vented product taken along line 2—2 of Figure 1.

In Figure 2, I have illustrated the cross-section and typical structure of the product made by the process of this invention; in which 3 represents the fabric substrate and 4 the vented thermoplastic resin coating. It will be observed that the resin layer is transformed into an evenly spaced and alternate series of bosses or mushroom like protuberances 1 and vents 2, the width of which is narrower at the surface of the coating than the central portion parallel with the fabric substrate.

The product of Example I has an LPV of 8840. A marked increase in pliability and in total mil thickness of the coated fabric is apparent after the transformation process.

A cushion of an automobile seat was covered with the colored embossed product. Tailoring properties of the material were surprisingly satisfactory, the finished seat was attractive and it was comfortable to sit on.

*Example II*

Example I is repeated, except the wire belt 20 is an endless wire conveyor belting of the cord type, with a mesh size of 100 x 25; and a colored vinyl calender composition of the approximate formula specified in Example I is applied to the knit fabric substrate.

The product is an equally desirable upholstery material, having an LPV of 7310.

It is to be understood that the process of this invention is by no means limited to the form of apparatus shown in the drawing. It is only necessary to provide a pair of pressure members which can be moved together continuously without any appreciable movement with respect to each other, while under pressure, to form a pressure zone of suitable length and intensity through which the resin coated fabric and the wire belt may be moved, and to which sufficient heat may be applied.

A band of resilient material, such as neoprene or cloth, may be mounted between the wire belt and the heated drum, if desired, to protect the surface of the drum.

Heating means may be provided to preheat the coating layer prior to entering the pressure zone, or to heat the pressure band as it passes into the pressure zone.

While standard wire conveyor belting has been found particularly advantageous as the wire belt for practicing this invention, other suitable wire materials may be used so long as they can be formed into an endless belt having an invisible seam or joint. Mesh size, pattern of weave, and other construction features of the wire belting may be varied according to the pattern and porosity desired in the finished product. A belt may be used which is equal in width to the width of the drum, or 2 or more belts of the same or different construction may be employed. It is also possible to join two or more lengths of wire conveyor belting having different patterns to form the belt 20 in which different sections of the belt produce different designs in the coating of the coated fabric.

The wire belt should have a total thickness or depth sufficient to reach the fabric substrate of the resin coated fabric under the conditions prevalent within the pressure zone.

When processing vinyl resin coated fabrics, the range of conditions used within the pressure zone will usually include temperatures of 300 to 375° F., pressures of about 50 to 100 p.s.i., and a pressure cycle or dwell time of 10 seconds to 3 minutes. When the pressure is too high the fabric substrate is damaged and the product has inferior strength. Excessive heat causes the resin to stick to the wires of the wire belt. Too little heat prevents embossing to a sufficient depth within a reasonable dwell time. The shorter dwell times require a greater amount of heat and the longer dwell times require a lesser amount of heat.

The substrate of the resin coated fabric may be any type of fabric, woven or nonwoven, made from natural or synthetic fibers. A preferred substrate for upholstery materials is knit cotton fabric, because it enhances the pliability, hand, stretch and tailoring properties of the product.

The principal thermoplastic resin component of the resin layer is preferably a vinyl chloride homopolymer or interpolymer of vinyl chloride in which the major constituent is vinyl chloride; or a mixture of such polymers may be used. Other flexible thermoplastic resin compositions may also serve as the resin layer of the resin coated fabric used in practicing this invention.

Thickness of the resin coating layer is not critical, but a thickness of 20 to 40 mills is ordinarily satisfactory. Very strict control of the conditions within the pressure zone is necessary when the resin thickness is less than about 20 mils.

The novel process for embossing and venting resin coated fabrics herein disclosed and described has numerous significant advantages. It is a continuous method, capable of fast and economical production. It is the first known continuous process which will transform continuous lengths of resin coated fabrics into deeply embossed and vented products having uninterrupted attractive patterns. It is the first known continuous process for producing high quality vinyl resin coated upholstery materials having deep undercut embossings. The process permits cooling the product prior to its removal from the woven wire embossing medium, thereby preserving the undercut shape of the bulbous vents and preventing the formation of rough edges on the mushroomed bosses.

The unusual depth and undercut nature of the vents result in greater attractiveness and better seating comfort than has heretofore been attainable in such products. The unique durability, appearance, permeability, pliability, and pleasant-to-touch texture are all advantages of the product obtainable by the process of this invention which make it highly useful as an upholstery material.

It will thus be seen that there has been provided by this invention a method, apparatus and product in which the various objects hereinabove set forth, together with many thoroughly practical advantages are successfully achieved.

While there are above disclosed but a limited number of embodiments of the structure, process and product of the invention herein presented, it is possible to produce still other embodiments without departing from the inventive concept herein disclosed, and it is desired therefore that only such limitations be imposed on the appended claims as are stated therein, or required by the prior art.

The embodiments of the invention in which an exclusive property or privilege is claimed are defined as follows:

1. A continuous process of embossing and venting a thremoplastic resin coated fabric which comprises continuously pressing a heated moving wire belt embossing element into and through heat softened thermoplastic coating on a fabric substrate, continuing the pressing at 50 to 100 p.s.i. for at least 10 seconds in a moving pressure zone, cooling said heat softened coating to a more solid condition while it is embedded within the interstices of the moving wire belt embossing element and thereafter continuously separating the wire belt from said coating.

2. A continuous process of embossing and venting a thermoplastic resin coated fabric which comprises applying heat to a thermoplastic resin coated fabric, continuously passing a heated wire belt embossing element and the thermoplastic resin coated fabric between two moving pressure elements in such a manner that the wire belt is pressed into and through the heat softened thermoplastic resin coating, continuing the pressing at 50 to 100 p.s.i. for at least 10 seconds, removing the wire belt and coated fabric from between the pressure elements while the belt is embedded in the coating, cooling said heat softened coating to a more solid condition while it is embedded within the interstices of the moving wire belt embossing element and finally removing the belt from the coating.

3. The process of claim 2 in which the pressure elements move through an arcuate path.

4. The process of claim 2 in which one of the pressure elements is a revolving drum and the other is an endless belt.

References Cited in the file of this patent
UNITED STATES PATENTS

| | | |
|---|---|---|
| 2,681,612 | Reimann | June 22, 1954 |
| 2,699,396 | Francis | Jan. 11, 1955 |
| 2,719,564 | Schneider | Oct. 4, 1955 |
| 2,776,451 | Chavannes | Jan. 8, 1957 |
| 2,776,452 | Chavannes | Jan. 8, 1957 |
| 2,826,509 | Sarbach | Mar. 11, 1958 |
| 2,894,855 | Wilhelm et al. | July 14, 1959 |